United States Patent
Storey (10) Patent No.: US 10,774,504 B2
(45) Date of Patent: Sep. 15, 2020

(54) INPUT-OUTPUT CONTROL MAPPING WITH CORRESPONDING SPLASH SCREEN

(71) Applicant: Caterpillar Forest Products Inc., Peoria, IL (US)

(72) Inventor: Joseph R. Storey, Newnan, GA (US)

(73) Assignee: Caterpillar Forest Products Inc., Peoria, IL (US)

( * ) Notice: Subject to any disclaimer, the term of this patent is extended or adjusted under 35 U.S.C. 154(b) by 67 days.

(21) Appl. No.: 16/015,310

(22) Filed: Jun. 22, 2018

(65) Prior Publication Data

US 2019/0390441 A1 Dec. 26, 2019

(51) Int. Cl.
*E02F 9/20* (2006.01)
*G05B 19/042* (2006.01)
*E02F 9/26* (2006.01)

(52) U.S. Cl.
CPC .............. *E02F 9/2012* (2013.01); *E02F 9/26* (2013.01); *G05B 19/042* (2013.01); *G05B 2219/23258* (2013.01); *G05B 2219/23388* (2013.01)

(58) Field of Classification Search
CPC ........ E02F 9/2012; E02F 9/26; G05B 19/042; G05B 2219/23388; G05B 2219/23258
See application file for complete search history.

(56) References Cited

U.S. PATENT DOCUMENTS

| 6,293,033 | B1 | 9/2001 | Moriya et al. | |
|---|---|---|---|---|
| 6,601,670 | B2 | 8/2003 | Kaneda et al. | |
| 7,069,131 | B2 | 6/2006 | Kim | |
| 9,604,668 | B2 | 3/2017 | Storey | |
| 2006/0064221 | A1* | 3/2006 | Sporer | E02F 9/2012 701/50 |
| 2014/0365014 | A1 | 12/2014 | Ryu | |
| 2017/0089043 | A1 | 3/2017 | Chang et al. | |
| 2017/0129500 | A1* | 5/2017 | Hipp | B60K 37/04 |
| 2018/0142446 | A1* | 5/2018 | Silber | E02F 9/26 |

FOREIGN PATENT DOCUMENTS

WO 2014136622 9/2014

* cited by examiner

*Primary Examiner* — Anne Marie Antonucci
(74) *Attorney, Agent, or Firm* — Schwegman, Lundberg & Woessner (57) ABSTRACT

A control system for a work machine includes an input device actuatable to generate a control signal, a display screen, and or more processing circuits. The one or more processing circuits are configured to render, on the display screen based on an operator of the machine, an indicator of a first mapping between the control signal and a first function of the machine. The one or more processing circuits are further configured to receive, from the operator using the display screen, a second mapping between the control signal and a second function of the machine. The one or more processing circuits are additionally configured to control the second function using the control signal in response to actuation of the input device.

17 Claims, 4 Drawing Sheets

INPUT-OUTPUT CONTROL MAPPING WITH CORRESPONDING SPLASH SCREEN

TECHNICAL FIELD

This document pertains generally, but not by way of limitation, to machine control systems, and more particularly, to mapping machine input device to control machine output functions.

BACKGROUND

Work machines can include a class of vehicles built to perform tasks such as construction, mining, harvesting, and various agricultural operations. These work machines can include, or can be configured with, one or more operating member (e.g., hardware are tools such as a gripper, a bucket, a blade, a boom, etc.) to perform functions in furtherance of these tasks. An operating member can be actuated by one or more electrically controlled hardware devices, such as motors, pumps, solenoids, and other actuators. A typical work machines can include one or more electronic controller (e.g., an electronic control module) that maps input available to a work machine operator to control signals that drive these hardware devices, and thus control the actuation of a given operating member. These electronic controllers can also interface with other input devices to control other operations of a work machine, such as navigation through screens of a software application, or the collection or tracking of statistical information related to the operation of the work machine or a task in which an operator of the work machine is currently engaged.

A given work machine can have one or more input devices that are configured (e.g., disposed in physical hardware within a control area of the work machine, such as a cabin of the work machine, and mapped through an electronic controller to control the actuation of a selected electrically controlled hardware device) to improve the utility of the work machine, such as by enabling an operator to conveniently control one or more operating members. While one configuration of input devices can be convenient for one operator of a work machine, the same configuration can be inconvenient for a different operator of the same work machine. Consequently, there is a need to enable operators of a given work machine to freely configure the input devices, such as to enable a selected input device to be mapped to control two or more different functions or tool of the work machine.

One technique of enabling an operator to map input devices of a work machine to selected functions or hardware elements is described in U.S. Pat. No. 7,069,131 B2 as issued to Kim et. al. on Jun. 27, 2006 (hereinafter, the '131 patent). The '131 patent discloses a technique for enabling a driver of a construction vehicle to change the relationships between on/off switches and driving units for driving work equipment coupled to a construction vehicle. The relationships between the on/off switches and the driving units are changeable using a text driven user interface. Changes to the relationships are store in a memory associated with an electronic controller.

The disclosed systems and method are directed to overcoming one or more of the problems set forth above, or in other techniques for mapping input, or control, devices to control functions of a work machine.

SUMMARY

Illustrative ammonia generation and storage systems and methods, and applications of such systems and methods in exhaust systems are described herein.

A control system for a work machine can enable an operator to personalize a work machine by remapping the outputs of one or more hardware input devices to control the actuation of one or more functions of the work machine. The control system can include an input device actuatable to generate a control signal, a display screen, and or more processing circuits. The one or more processing circuits can be configured to render, on the display screen based on an operator of the machine, an indicator of a first mapping between the control signal and a first function of the machine. The one or more processing circuits can be further configured to receive, from the operator using the display screen, a second mapping between the control signal and a second function of the machine. Additionally, the one or more processing circuits can be configured to control the second function using the control signal in response to actuation of the input device.

A method for operating a control system in work machine, so as to enable an operator to personalize the control system, can include rendering, on a display screen based on an identifier of the operator, an indicator showing a first mapping between a control signal and a first function of the machine. The method can also include receiving, from the operator using the display screen, a second mapping between the control signal and a second function of the machine. The method can then include controlling the second function using the control signal in response to receiving the control signal.

A control system of a work machine can include a non-transitory computer-readable storage medium storing a set of instructions that, when executed by at least one processor of a machine, cause the machine to perform operations comprising rendering, on a display screen based on an identifier of the operator, an indicator showing a first mapping between a control signal and a first function of a machine; receiving, from the operator using the display screen, a second mapping between the control signal and a second function of the machine, and controlling the second function using the control signal in response to receiving the control signal.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various examples discussed in the present document.

The headings provided herein are merely for convenience and do not necessarily affect the scope or meaning of the terms used

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques are not necessarily shown in detail.

Electronic controllers and in cabin displays of a work machine can enable operators of the work machine to generate personalized input device configurations. Such configurations can indicate one or more mapping, or functional relationship, between a hardware input, or control, device (hereinafter, "input device") and an output function of the work machine. An operator of a work machine (hereinafter, "operator"), for example, can select an input device that is initially configured to actuate a first function, and change the configuration the selected input device to cause the input device to actuate a second function. In an example, an input device, such as a push-button on a joystick, that is initially configured to close a hydraulic grappling tool can be reconfigured by an operator to trigger an electronic counter, such as to enable the manual counting of the number of trees harvested by a work machine. Similarly, other input devices that are initially configured to actuate, for example, mechanical or functions of a work machine can be reconfigured to actuate other functions, such as cameras, graphic user interface (GUI) navigation elements (e.g., GUI shortcuts), and digital controls of electronic devices (e.g., radio commands). In some examples, an input device can be reconfigured to actuation one or more output functions of a work machine. In other examples, two or more input devices can be reconfigured to actuate the same output functions of a work machine.

Existing techniques that enable operators to personalize input devices of a work machine cab be inefficient in terms of operator time, lead increase operator error, and can reduce operator productivity. In one example, a work machine that has one or more configurable input devices and which can be operated by two or more operators can have to be configured with the personalized configurations of each operator each time there is a change in operators. Such configuring can include an operator changing the configuration of each configurable input device to his personal configurations each time he takes over control of a work machine from another operator. The time each operator takes to complete this manual configuration can add to the time it takes to complete a particular task using a work machine. Additionally, when a new operator takes control of a work machine that was previously personalized by another operator, there is a possibility that the new operator can attempt operate the work machine without an understanding to the programmed configurations of the pervious operator. This can result in errors in operation the work machine, which can cause damage to the work machine or injury to the new operator. In another example, an operator of a work machine that has two or more configurable input devices can generate personalized mappings for several of these input devices. Memorizing each of these personalized mappings can be difficult, which can increase operator fatigue while reducing their response times. This can ultimately result in a reduction of operator productivity.

Embodiments of the present disclosure include techniques (e.g., systems, methods, and computer readable storage mediums) that enables an operator to personalize one or more input devices of a work machine while overcoming the problems in the previously described techniques. In an example, the techniques of the present disclosure can enable an operator of a work machine to generate one or more control maps, or control patterns, for configuring automatically configuring one or more input devices according to preferences of the operator. A control map can include a data structure populated with a configuration for a mapping one or more input devices to one or more functions of a work machine. The control map can be loaded into a memory of an electronic controller of a work machine to automatically configure the mapping for each input device. Accordingly, an operator can switch between two or more control maps without expending the time required for manual configuration.

In another example, a work machine configured with one or more control maps can render, such as on display device within a control area of the work machine, a graphical representation of a selected control map along with a prompt to acknowledge or accept selected control map. The work machine can inhibit operation of the machine by an operator until the operator acknowledges or accepts the configuration. This can reduce the likelihood of an operator erroneously operating a work machine that is personalized for another operator. The graphical representation of the control map can also provide a visual reminder of the relationship between each personalized input device and a corresponding output function associated with the personalized input device, such as by rendering a graphic indicator of each input device and graphic indicating a connection to a graphical indicator of an output function controlled by the input device.

Figure 1:
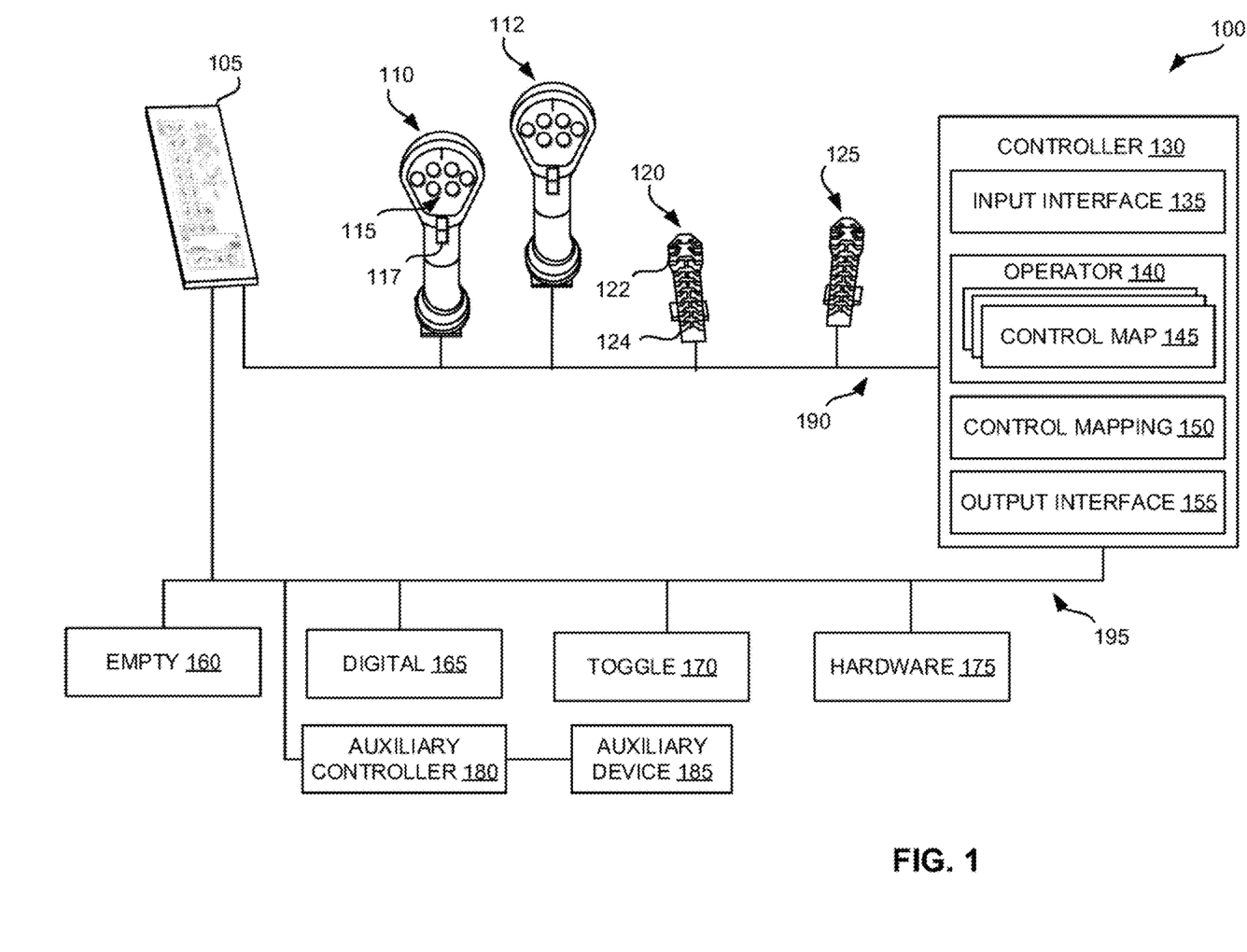
FIG. 1 illustrates an example of a system for mapping one or more input devices of a work machine to control one or more output functions of the work machine, in accordance with at least one example.

FIG. 1 illustrates an example of a system 100 for mapping one or more input devices of a work machine to control one or more functions of the work machine, in accordance with at least one example. The system 100 can be a component of a work machine, such as an excavator, a harvester, a backhoe loader, or other work machine having one or more operator configurable input devices. The system 100, for example, can be included in one or more control systems of such a work machine. The system 100 can include a graphical interface device 105, control levers 110 and 112, control pedals 120 and 125, an electronic controller 130, an empty output 160, a digital output function 165, a digital toggle output function 170, a hardware device 175, an auxiliary controller 180, an auxiliary device 185, and communication channels 190 and 195.

The graphical interface device (GID) 105 can include a display component configured to display information about the operation of a work machine. The display component can include a display device, such as a plasma display panel (PDP), a light emitting diode (LED) display, a liquid crystal display (LCD), a projector, or a cathode ray tube (CRT). The information displayed on the GID 105 can include text or graphics based representations of input devices, software functions or applications, hardware functions, machine or task statistics, or operator information (e.g., an operator identifier or other credentials). The GID 105 can also include an input component to enable an operator of a work machine to control, interact with, and update, the information rendered on the display component. Such an input component can include a tactile interface, such as a touch screen layer dispose over a display surface of the display component, a pointing device (e.g., a computer mouse or a track ball), or one or more hardware buttons, switches or control levers. In some embodiments, the GID 105 can include one or more electrical circuits to process operator inputs receive from the input component, and to store or generate renderings of the information displayed by the display component. The one or more electrical circuits can interface with the electronic controller 130 (hereinafter, "controller 130") over communication channel 190, such as to transfer information to, and received information from, the electronic controller.

The control levers 110 and 112, and input pedals 120 and 125 can each be examples of configurable hardware input devices, as described herein. Each of these hardware input devices can include one or more configurable input device, such as pushbuttons 115, toggle switch 117, anterior pedal input device 122, and posterior pedal input device 124. The control levers 110 and 112, and input pedals 120 and 125 can interface with the controller 130 using the communication channel 190, such as to transmit one or more control signals generated by the input devices to the controller. In an example, one or more of the pushbuttons 115 and the toggle switch 117 can be electrically coupled to one or more digital input ports of the controller 130, while the anterior pedal input device 122 and posterior pedal input device 124 can be electrically coupled to one or more analog input ports of the controller.

The controller 130 can be an electrical controller, such as any controller of a work machine, having one or more electrical circuits (e.g., a processing circuit, memory circuits, and other digital or analog circuits) or software modules for operating the system 100. In some examples, the controller 130 can include a controller to controlling the GID 105. The controller 130 can include an input interface 135, an operator component 140, a control mapping component 150, and an output interface 155.

The input interface 135 can include one or more hardware ports (e.g., including buffer, conditioning, and data bus interface circuits) for receiving input from one or more input devices coupled to the communication channel 190. The input interface 135 can also include one or more electrical circuits or software modules that are executable by the one or more processing circuits (not shown) to digitize and further process the received input.

Operator component 140 can include a database or other data structure for storing one or more control map 145 associated with an operator. In an example, the database can be a table having records disposed in rows to indicate mappings between in input device and an output function. A row of the table can include an input column listing one or more configurable input device, and an output column listing one or more corresponding output functions to which an input device is mapped. An input device can be identified in the database by an input port of the controller 130 to which the input device is coupled, or by an input device identifier, such as a unique string, label, or symbol associated with a particular input device. Similarly, an output function can be identified in the database by an output port of the controller 130 to which the output function is coupled, or by an identifier such as a unique string, label, or symbol associated with a particular output device that can be actuated by a control signals generated by corresponding input device. Other techniques for associating an input to the electronic controller 130 with an output of the electronic controller can be used to store a control map 145.

In some examples, a database or other data structure associated with operator component 140 can include operator information to associate an operator. Such operator information can be stored in association with one or more control maps 145, and can be used by the controller 130 to retrieve one or more control maps. Such operator information can include an operator identifier or other operator credentials (e.g., an operator login name and passcode) used by an operator to access a work machine.

Control mapping component 150 can include one or more electrical circuits or software modules for mapping, based on a selected control map 145, inputs received through input interface 135 to outputs provided to output interface 150. Such mapping can include receiving a digitized input through the input interface 135, conditioning the input according to a mapping specified by the control map 145, and transmitting the conditioned input to a specified output port of the output interface 150. In some examples, the control mapping component 150 or the control map 145 can include a database of one or more conditioning algorithms for transforming, based on a mapping indicated in the control map 145, a digitized input having values in a first domain to a conditioned value in a second domain. In an example, a discretized continuous valued input can be received from the anterior pedal input device 122 through input interface 135. The control mapping component 150 can determine, based a currently loaded control map 145, that the received input it to be mapped to control a binary output function, such as a toggle function 165. The control mapping component 150 can then identify, based on the determined mapping, an algorithm (e.g., a thresholding function) to condition the discretized continuous valued input, or another value generated based on the discretized continuous valued input, to generate a binary value. The control mapping component 150 can then transmit, based on the identified mapping, the conditioned value (e.g., the binary output of the thresholding function) to an output port of output interface 150 that is coupled to the toggle function 165.

The output interface 155 can include one or more hardware ports (e.g., including buffer, conditioning, and data bus interface circuits) for transmitting electrical control signals to actuate one or more hardware output functions. In some examples, the output interface 155 can also include one or more software ports (e.g., operating system sockets, shared memory elements or locations, and other inter-process communication constructs) for transmitting logical control signals (e.g., digital data values) to actuate one or more software output functions.

Output functions 160, 165, 170, 175 and 185 can be examples of hardware and software functions of a work machine that can be controlled by the control system 100. Each of the output functions can represent a class of hardware devices or software functions to which one or more input devices can be mapped.

In an example, an input device that was previously mapped to actuate of a first output function can be remapped to the empty function 160, so as to disable the input device, so as to prevent actuation of the input device from controlling the actuation of any other software function or hardware output device.

In another example, an input device that was previously mapped to actuate of a first output function can be remapped to a digital function 165, such as to cause actuation of the input device to control the actuation of one or more software, or digitally, controlled devices such as radios, heating-ventilation-and-air conditioning (HVAC) devices, and telephones. In an example, one or more pushbutton input device 115 can be mapped to change a volume control of a digitally controlled radio coupled to the controller 130 through output interface 155.

In another example, an input device that was previously mapped to actuate of a first output function can be remapped to a digital toggle function 170, such as to cause actuation of the input device to control the actuation of one or more software based functions, such as shortcuts for navigating between display screens of the GID 105, software based counters (e.g., a payload counter), and automatic machine control algorithms. In some examples, the digital toggle function 170 can include hardware functions that are actuated by a single-shot digital signal, such as work machine lamps.

In another example, an input device that was previously mapped to actuate of a first output function can be remapped to a hardware function 175, such as to cause actuation of the input device to control the actuation of one or more electrically controlled hardware output device, such as a relay, physical switch, or solenoid, such as to control the actuation of mechanically actuated hardware devices, such as valves, pumps, or motors.

In another example, an input that was previously mapped to actuate of a first output function can be remapped to actuate of one or more auxiliary device 185, such as through an auxiliary controller 180.

Communication channels 190 and 195 can include one or more physical communication bus (e.g., a controller area network bus), or one or more electrical, magnetic, or optical circuits for coupling an input device and an output device to the controller 130. In some examples, the communication channel 190 and 195 can include a logical communication channel (e.g., operating system sockets, shared memory elements or locations, and other inter-process communication constructs), such as for exchanging digital signals between one or more software applications, software modules, or components of the control system 130.

In operation, the control system 130 can render an image (e.g., a graphical indicator) including graphical representations of one or more input devices that an operator can personalize or remap, such as to change output functions controlled the one or more input devices. In some examples, for each input device having a representation in the rendered image, the rendered image can include a graphical representation of an output function controlled by the input device. The controller 130 can enable an operator to remap the output of an input device to control another output function, such as by generating and rendering, on the GID 105, a set of one or more output functions from which an operator can select a replacement output function. After an operator generates a set of one or more input devices mappings, the controller 130 can store the ne mappings in a control map 145. The controller can then store the control map 145 in an operator database associated with operator component 140. In some examples, the controller can store associate the stored control map 145 with an identifier or other account credentials associated with the operator.

In an example operation, when an operator accesses work machine, such as by logging into the GID 105 using a set of operator credentials (e.g., an operator identifier and a passcode), the controller 130 can render an image, or another indicator, of a previously generated a control map 145 along with a prompt to the operator to acknowledge or accept the rendered control map. The controller 130 can disable operation of the work machine, such as by disabling the control system 100, until the operator accepts the control map 145. After the operator accepts the rendered control map, the controller 130 can configure the control system 100 with the control map 145, such as through the operation of control mapping component 150.

Figure 2:
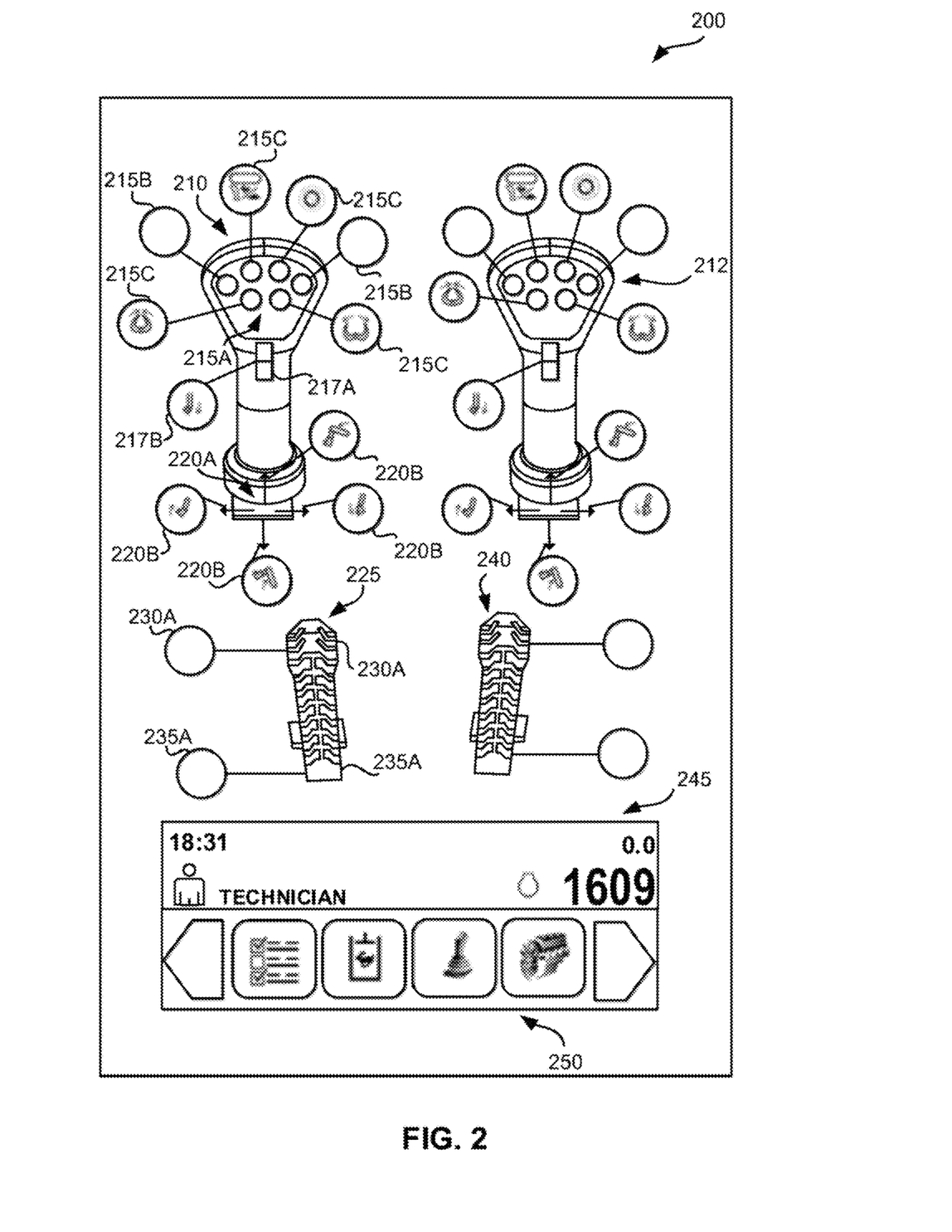
FIG. 2 illustrates an example of a graphical interface device showing an interface including an image of a control map indicating a mapping relationship between input devices of work machine and output functions of the work machine, in accordance with at least one example.

FIG. 2 illustrates an example of a graphical interface device showing an interface 200 including an image of a control map indicating a mapping relationship between input devices of a work machine and output functions of the work machine, in accordance with at least one example. The GID can be an example of the GID 105 (FIG. 1). In an example, the image of the control map (hereinafter, "rendered control map") displayed in the GID 200 can be rendered after an operator logs in to a work machine configured with a control system such as the control system 100 (FIG. 1). In some examples, a prompt to acknowledge or accept the rendered control map can be initially superimposed on the interface 200, and the rendered control map can be disabled, along with control of the work machine, until an operator acknowledges or accepts the control map. In addition to the rendered control map, the interface 200 can include an information display area 245, such as to display work machine or operator specific information, such work machine operation data and an operator identifier. The interface 200 can also include a set of input controls (e.g., shortcuts) 250 for navigating between displays screens or interfaces of the GID 105.

As shown in FIG. 2, the rendered control map can include graphical representations of the set of configurable input devices that are available on a work machine and remappable by the control system 100. In an example, the rendered control map can include control lever images 210 and 212 corresponding to control levers 110 and 112, and control pedals images 225 and 240 corresponding to control pedals 120 and 125. The rendered control map can also include graphical representations of output functions controlled by the set of rendered input devices. In an example, the rendered control map can include a set of circular controls coupled to each configurable input device. Images within the circular controls can indicate an output function that is controlled by the coupled input device. In some examples, a circular control without an image, or having a suppressed image, can indicate that an input device that is coupled to the circular control is not mapped to control an output function (e.g., the input device is mapped to the empty function 160). In an example, while the pushbutton input devices 215A are be coupled to circular controls 215B and 215C, only the pushbuttons coupled to circular controls 215C are mapped to control output functions. Similarly, while input devices 217A, 220A, 230A, and 235A are coupled, respectively, to circular controls 217B, 220B, 230B, and 235B, only the input devices coupled to circular controls 217A, 220A are mapped to control output functions.

Figure 3:
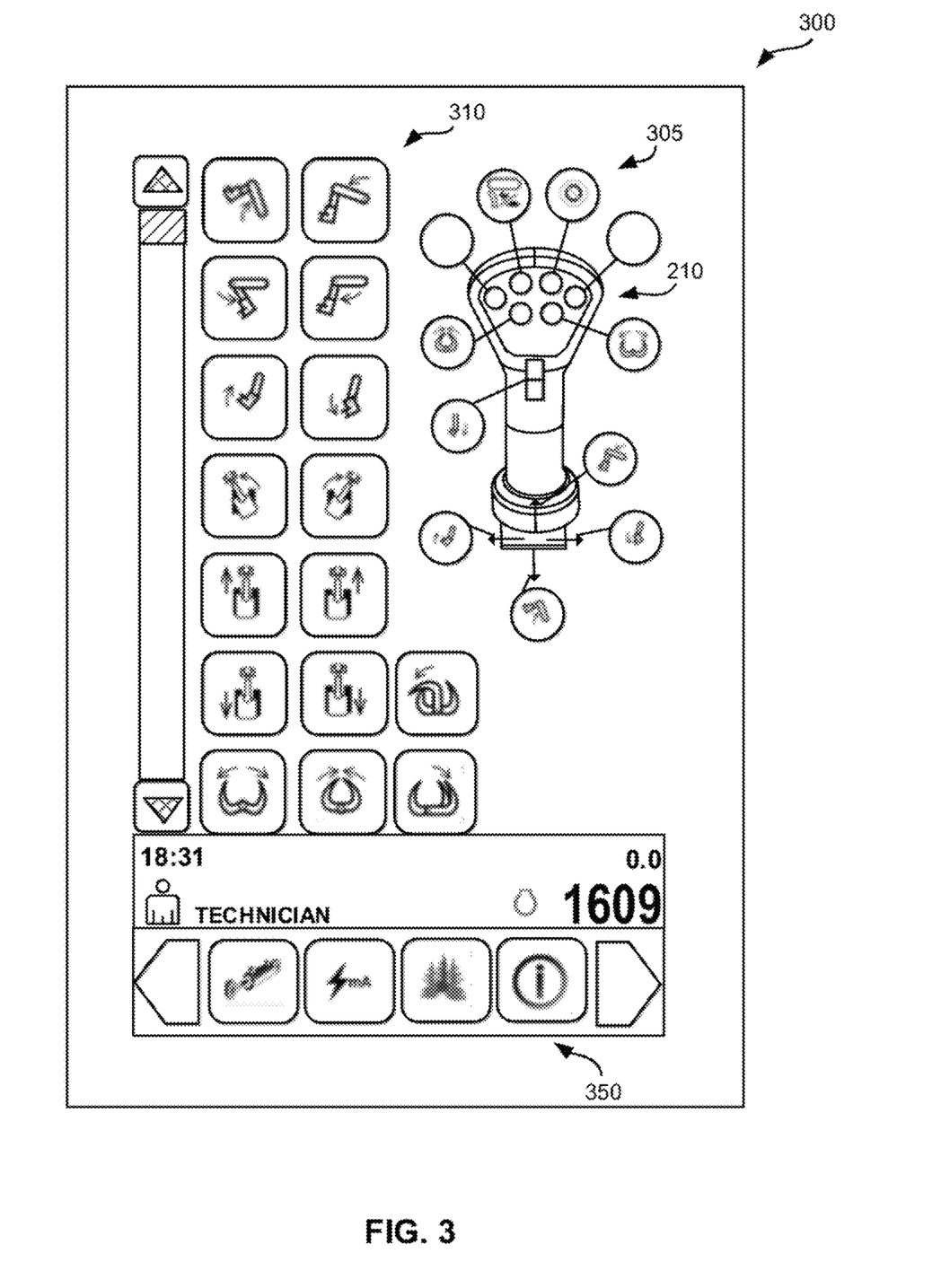
FIG. 3 illustrates an example of a graphical interface device showing an interface for configuring a mapping between input devices of work machine and functions of the work machine, in accordance with at least one example.

In some examples, an operator of a work machine can interact with the rendered control map through the interface 200, such as by using an input device associated with the GID 105 (e.g., a touch screen input layer or a scrolling and selecting device such as a joystick), to change the mapping between one or more input devices and one or more output functions, as described in the discussion of FIG. 3.

In some examples, an operator can recall or display the interface 200 at any time during operation of a work machine. In other examples, the display interface 200 can provide visual feedback in response to the actuation of an input device. Such visual feedback can include rendering, on the interface 200, an indicator that is associated with the actuated input device. In an example, the indicator can include a highlighting, color, or texture change to a circular control coupled to the actuated input device.

Although a circular control is used in the examples described herein, other shapes of controls, icons, or other objects can be used to indicate an association between an input device and an output function without reducing the scope of the present disclosure.

FIG. 3 illustrates an example of a graphical interface device showing an interface 300 for configuring a mapping between input devices of a work machine and output functions of the work machine, in accordance with at least one example. In an example, an operator can access the interface 300 by selecting, on the interface 200, a circular control coupled to an input device. In a specific example, an operator can access the interface 300 by selecting one of the circular controls 215C to remap one of the pushbuttons 215A to a different output function. In other examples, an operator for can access the interface 300 using the shortcut menu 250 or other GID screen navigation tools or operations.

As shown in FIG. 3, the interface 300 includes a control lever 210, a set of circular controls 305 coupled to input devices of the control lever, and a set of icons representing work machine output functions 310 that can be mapped to one or more input device.

In an example, an operator can use the interface 300 to change the mapping between an input device and an output function by selecting the input device, or a circular control coupled to the input device, and then selecting an icon corresponding to an output function to be mapped to the selected input device. Other techniques can be for changing a mapping, such as dragging an icon of a desired output function to a circular control that is coupled to an input device that will be used to control the output function, or selecting an icon of a desired output function followed by selecting a circular control having an output function that is to be replaced. In some examples, a graphical representation of the replacement output function can be rendered in a circular control coupled to the input device that will control that actuation of the replacement function.

After the remapping process is completed, the controller 130 can save the new mapping and return the operator to interface 200, or to another GID interface.

Figure 4:
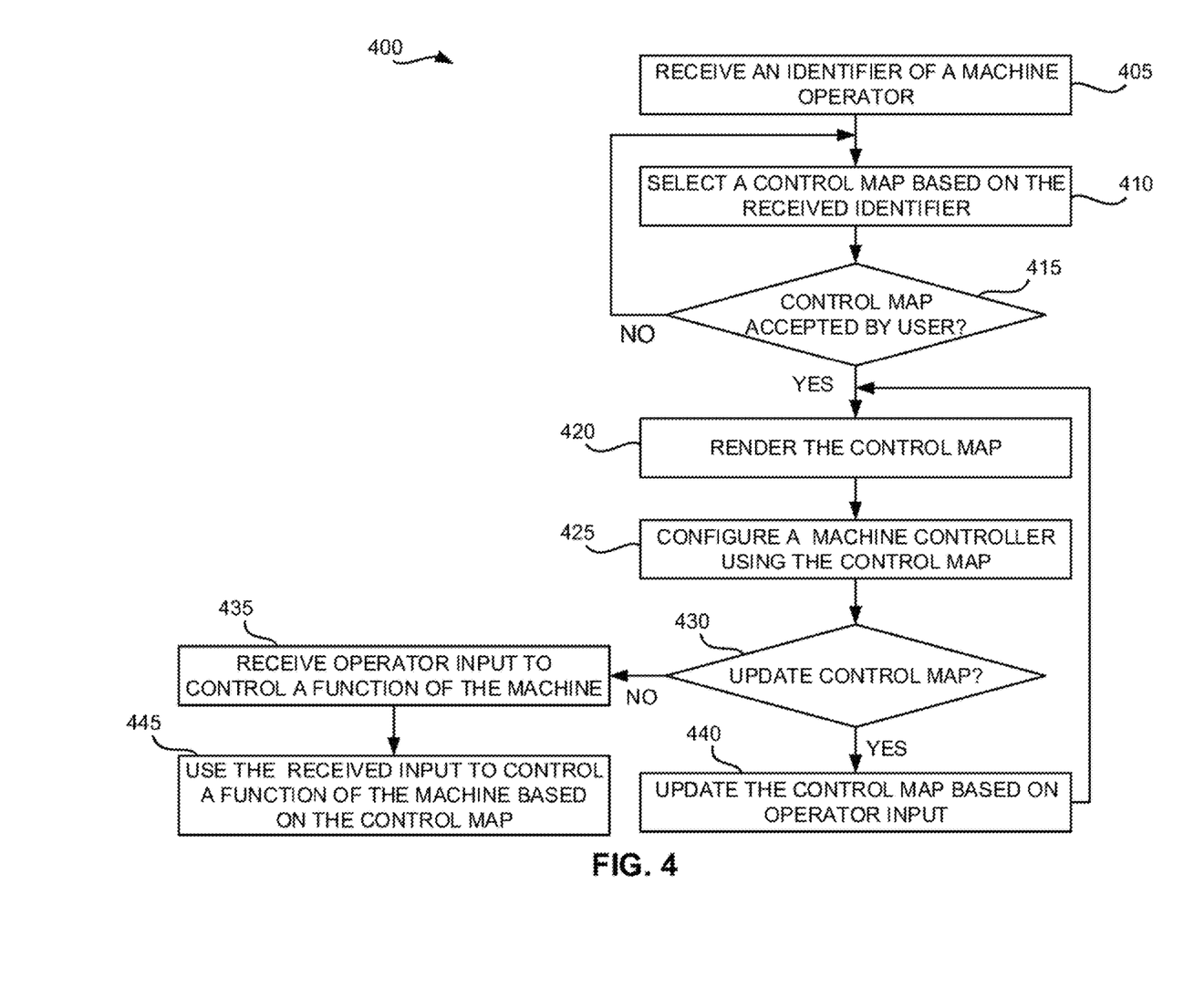
FIG. 4 illustrates an example of a technique for operating a system for mapping one or more inputs devices of a work machine to control one or more functions of the work machine, in accordance with at least one example.

FIG. 4 illustrates an example of a technique 400 for operating a control system for mapping one or more input devices of a work machine to control one or more output functions of the work machine, in accordance with at least one example. The technique can be used by the control system 100 (FIG. 1) in conjunction with the interface 200 (FIG. 2) and the interface 300 (FIG. 3). In an example, the technique 400 can be used by a controller of the control system 100, such as the controller 130. Accordingly, one or more electrical circuits of the controller can be actuated, or one or more software modules can be executed by the one or more circuits of the controller, to perform or execute the steps of the technique 400.

At 405, the controller can receive an identifier of a machine operator. The identifier can include login or account information of the operator, such as a unique operator identifier and a passcode.

At operation 410, the controller can select, such as from a storage device accessible to the controller, a control map based on the received operator identifier. The controller can render an indicator of the selected control map, such as on GID 105. The controller can also render a prompt, such as a dialog box or other input control, along with the indicator of the selected control map. The prompt can request that an operator acknowledges or accepts the selected control map. Additionally, the controller can disable operation of the work machine until the controller receives input from an operator indicating acceptance of the selected control map.

At operation 415, the controller can determine whether input received from an operator in response to the rendered prompt indicate acceptance of the of the selected control map. The controller can return to operation 410 when the received input does not indicate acceptance of the of the selected control map, while the controller can proceed to 420 when the received input does indicate acceptance of the of the selected control map.

At 420, the controller can render an image of the selected control map. In some examples the selected control map can be rendered at 410, along the rendered prompt.

At operation 425, the controller can be configured according to one or more input devices to output function mappings or relationships included in the selected control map. Such configuring can include changing the mapping, within the electrical controller, between one or more input devices and one or more output functions of the machine, as described herein.

At operation 430, the controller can determine whether an operator has issued a request to update the selected control map. The controller can proceed to 440 in response to a request to update the selected control map, while the controller can continue the technique 400 at 435 when the operator elects to operate the machine without updating the selected control map.

At 440, the controller can update the selected control map, or generate a new control map, in response to operator input, such as operator input receive through interface 300. The controller can then return to 420.

At 435, the controller can receive operation input, such as from an input device such as control lever 110 or control pedal 120, to control a function (e.g., an output function) of the machine.

At 445, the controller can use the received input to control a function of the machine based on the input device to output function relationships included in the control map and can used to configure the electrical controller at 425.

In an example, the control system 100 can include a machine readable medium to perform any of the steps of the technique 400. In an example, the term "machine readable medium" can include a single medium or multiple media (e.g., a centralized or distributed database, or associated caches and servers) configured to store one or more instructions.

The term "machine readable medium" can include any medium that is capable of storing, encoding, or carrying instructions for execution by a machine and that cause the machine to perform any one or more of the techniques of the present disclosure, or that is capable of storing, encoding or carrying data structures used by or associated with such instructions. Non-limiting machine readable medium examples can include solid-state memories, and optical and magnetic media. Specific examples of machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The above detailed description includes references to the accompanying drawings, which form a part of the detailed description. The drawings show, by way of illustration, specific examples in which the invention can be practiced. These examples are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other examples can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed example. Thus, the following claims are hereby incorporated into the Detailed Description as examples or examples, with each claim standing on its own as a separate example, and it is contemplated that such examples can be combined with each other in various combinations or permutations. The scope of the invention should be determined with reference to the appended claims, along with the full scope of equivalents to which such claims are entitled.

INDUSTRIAL APPLICABILITY

The disclosed techniques provide a control system that enables an operator to personalize mappings between hardware input devices and output functions of a work machine, while reducing machine configuration time, operator fatigue, and risk of machine damage or operator injury.

In an example, the techniques of the present disclosure can enable an operator of a work machine to generate one or more control maps, or control patterns, for configuring automatically configuring one or more input devices according to preferences of the operator. A control map can include a data structure populated with a configuration for a mapping one or more input devices to one or more functions of a work machine. The control map can be loaded into a memory of an electronic controller of a work machine to automatically configure the mapping for each input device. Accordingly, an operator can switch between two or more control maps without expending the time required for manual configuration.

In another example, a work machine configured with one or more control maps can render, such as on display device within a control area of the work machine, a graphical representation of a selected control map along with a prompt to acknowledge or accept selected control map. The work machine can inhibit operation of the machine by an operator until the operator acknowledges or accepts the configuration. This can reduce the likelihood of an operator erroneously operating a work machine that is personalized for another operator. The graphical representation of the control map can also provide a visual reminder of the relationship between each personalized input device and a corresponding output function associated with the personalized input device, such as by rendering a graphic indicator of each input device and graphic indicating a connection to a graphical indicator of an output function controlled by the input device.

What is claimed is:

1. A control system for a machine comprising:
an input device actuatable to generate a control signal;
a display screen; and
one or more processing circuits configured to:
  render, on the display screen based on an operator of the machine, a first image of the input device, a second image of a first function of the machine, and a graphical indicator of a connection between the first image and the second image to indicate first mapping between the control signal and the first function of the machine,
  receive, from the operator using the display screen, a second mapping between the control signal and a second function of the machine,
  control the second function using the control signal in response to actuation of the input device; and
  wherein the one or more processing circuits are further configured to:
  render, on the display screen based on the operator of the machine, another indicator of the mapping between the control signal and the second function of the machine;
  receive an acknowledgement signal from the operator based on the displayed indicator; and
  inhibit control of the second function using the control signal until the acknowledgement signal indicates an acceptance of the second mapping.

2. The control system of claim 1, wherein:
the first function is configured to actuate a hardware device coupled to the machine; and
the second function is configured to actuate at least one of:
a digital control circuit,
hardware control circuit,
a digital toggle circuit, and
an auxiliary device.

3. The control system of claim 2, wherein:
the second function is configured to actuate an auxiliary device, the auxiliary device comprising an auxiliary control system that is controllable by an auxiliary input to the auxiliary device; and
to control the second function using the control signal in response to actuation of the input device is to transmit an auxiliary control signal to the auxiliary input to control the auxiliary control system, the auxiliary control signal being generated using the control signal.

4. The control system of claim 1, wherein the one or more processing circuits are further configured to render, on the display screen, a real-time representation of the control system.

5. The control system of claim 1, wherein to receive, from the operator using the display screen, the second mapping between the control signal and the second function of the machine is to:
receive credentials of the operator; and
retrieve, based on the credentials, the second mapping from a storage device associated with the one or more processing circuits.

6. The control system of claim 1, wherein to receive, from the operator using the display screen, the second mapping between the control signal and the second function of the machine is to:
receive, using the display screen and the indicator of the first mapping, input from the operator to associate the control signal with the second function;
generate the second mapping using the received input; and
store the second mapping in a data record associated with the operator.

7. The control system of claim 6, wherein second function is selected from one or more functions of the machine selectable using the display screen.

8. The control system of claim 6, wherein the indicator comprises an image of the input device, and an icon indicating the first function and associated with the image of the input device.

9. The control system of claim 1, wherein:
the first function is controllable using a first output signal;
the second function is controllable using a second output signal;
prior to receiving the second mapping, the one or more processing circuits are configured to generate the first output signal based on the control signal; and
to control the second function using the control signal in response to actuation of the input device comprises configuring the one or more circuits to generate the second output signal based on the control signal.

10. A method for operating a control system in a machine, the control system personalized for an operator of the machine, the method comprising:
rendering, on a display screen based on an identifier of the operator, an indicator showing a first mapping between a control signal and a first function of the machine, the indicator comprising a first image that is indicative of an input device to generate the control signal and a second image that is indicative of a controlled device to perform the first function;
receiving, from the operator using the display screen, a second mapping between the control signal and a second function of the machine;
controlling the second function using the control signal in response to receiving the control signal from an input device;
rendering, on the display screen based on the operator of the machine, a new indicator showing the mapping between the control signal and a second function of the machine;
receiving an acknowledgement signal from the operator based on the new indicator; and
inhibiting control of the second function using the control signal until the acknowledgement signal indicates an acceptance of the second mapping.

11. The method of claim 10, wherein:
the first function actuates a hardware device coupled to the machine; and
the second function actuates at least one of:
a digital control circuit,
hardware control circuit,
a digital toggle circuit, and
an auxiliary device.

12. The method of claim 11, wherein:
the second function is configured to actuate an auxiliary device, the auxiliary device comprising an auxiliary control system that is controllable by an auxiliary input to the auxiliary device; and
controlling the second function using the control signal in response to actuation of the input device comprises transmitting an auxiliary control signal to the auxiliary input to control the auxiliary control system, the auxiliary control signal being generated using the control signal.

13. The method of claim 10, further comprising:
rendering, on the display screen, a real-time representation of the control system.

14. The of claim 10, wherein receiving, from the operator using the display screen, the second mapping between the control signal and the second function of the machine comprises:
receiving an identifier of the operator;
retrieving, based on the identifier of the operator, the second mapping from a storage device associated with the control system.

15. The method of claim 10, wherein receiving, from the operator using the display screen, the second mapping between the control signal and the second function of the machine comprises:
receiving, using the display screen and the indicator showing the first mapping, configuration input from the operator to associate the control signal with the second function;
generating the second mapping using the configuration input; and
storing the second mapping in a data record associated with the operator.

16. A non-transitory computer-readable storage medium storing a set of instructions that, when executed by at least one processor of a machine, cause the machine to perform operations comprising:
rendering, on a display screen based on an identifier of the operator, an indicator showing a first mapping between a control signal and a first function of a machine;
receiving, from the operator using the display screen, a second mapping between the control signal and a second function of the machine;
controlling the second function using the control signal in response to receiving the control signal from an input device;
rendering, on the display screen based on the operator of the machine, a new indicator showing the mapping between the control signal and a second function of the machine;
receiving an acknowledgement signal from the operator based on the new indicator; and
inhibiting control of the second function using the control signal until the acknowledgement signal indicates an acceptance of the second mapping.

17. The non-transitory computer-readable storage medium of claim 16, wherein:
- receiving, from the operator using the display screen, the second mapping between the control signal and the second function of the machine comprises:
- receiving, using the display screen and the indicator of the first mapping, configuration input from the operator to associate the control signal with the second function;
- generating the second mapping using the configuration input; and
- storing the second mapping in a data record associated with the operator.

\* \* \* \* \*